(12) United States Patent
Yuan et al.

(10) Patent No.: US 11,521,602 B2
(45) Date of Patent: Dec. 6, 2022

(54) INTENT RECOGNITION MODEL CREATION FROM RANDOMIZED INTENT VECTOR PROXIMITIES

(71) Applicant: International Business Machines Corporation, Armonk, NY (US)

(72) Inventors: Zhong Fang Yuan, Xian (CN); Kun Yan Yin, Ningbo (CN); Yuan Lin Yang, Beijing (CN); Tong Liu, Xian (CN); He Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 17/315,553

(22) Filed: May 10, 2021

(65) Prior Publication Data

US 2021/0264906 A1    Aug. 26, 2021

Related U.S. Application Data

(63) Continuation of application No. 16/390,845, filed on Apr. 22, 2019, now Pat. No. 11,069,346.

(51) Int. Cl.
*G10L 15/18* (2013.01)
*G10L 15/22* (2006.01)
*G10L 15/10* (2006.01)

(52) U.S. Cl.
CPC .......... *G10L 15/1815* (2013.01); *G10L 15/10* (2013.01); *G10L 15/22* (2013.01); *G10L 2015/223* (2013.01)

(58) Field of Classification Search
USPC ..................................... 704/1–504
See application file for complete search history.

(56) References Cited

U.S. PATENT DOCUMENTS

| | | | | |
|---|---|---|---|---|
| 7,805,288 | B2 * | 9/2010 | Guo | G06F 16/36 704/7 |
| 9,135,237 | B2 * | 9/2015 | Deshmukh | G06F 40/247 |
| 9,569,427 | B2 * | 2/2017 | Homma | G06N 20/00 |
| 10,191,999 | B2 * | 1/2019 | Liu | G06F 40/30 |
| 10,388,274 | B1 * | 8/2019 | Hoffmeister | G06N 3/0445 |
| 10,453,117 | B1 * | 10/2019 | Reavely | G06F 40/30 |
| 10,720,160 | B2 * | 7/2020 | Schramm | G10L 15/30 |
| 10,733,375 | B2 * | 8/2020 | Li | G06F 40/211 |
| 10,748,546 | B2 * | 8/2020 | Kim | G10L 15/30 |
| 10,839,159 | B2 * | 11/2020 | Yang | H04L 51/02 |

(Continued)

FOREIGN PATENT DOCUMENTS

CN    103942198 A    7/2014
CN    107526725 A    12/2017

(Continued)

OTHER PUBLICATIONS

List of IBM Patents or Patent Applications Treated as Related. Filed May 10, 2021, 2 pages.

(Continued)

*Primary Examiner* — Marcus T Riley
(74) *Attorney, Agent, or Firm* — Christopher M. Pignato

(57) ABSTRACT

A set of candidate intent vectors is generated from an input intent vector. A validation of the set of candidate intent vectors is performed that selects as valid intent vectors any of the set of candidate intent vectors that are semantically similar to the input intent vector.

20 Claims, 6 Drawing Sheets

(56) References Cited

U.S. PATENT DOCUMENTS

| | | | |
|---|---|---|---|
| 11,069,346 B2* | 7/2021 | Yuan | G06F 40/30 |
| 2013/0268468 A1* | 10/2013 | Vijayaraghavan | G06N 20/00 706/12 |
| 2015/0317302 A1* | 11/2015 | Liu | G06F 40/40 704/9 |
| 2018/0204184 A1* | 7/2018 | Rosenberg | G06Q 10/103 |
| 2018/0232201 A1* | 8/2018 | Holtmann | H04R 1/406 |
| 2018/0232662 A1* | 8/2018 | Solomon | G10L 15/26 |
| 2018/0233140 A1* | 8/2018 | Koishi | H04N 5/332 |
| 2018/0293221 A1* | 10/2018 | Finkelstein | G06N 20/00 |
| 2019/0236130 A1* | 8/2019 | Li | G10L 15/22 |
| 2020/0335095 A1* | 10/2020 | Yuan | G10L 15/1815 |
| 2021/0264906 A1* | 8/2021 | Yuan | G10L 15/1815 |

FOREIGN PATENT DOCUMENTS

| | | |
|---|---|---|
| CN | 104346406 B | 5/2018 |
| CN | 108090520 A | 5/2018 |
| CN | 108829722 A | 11/2018 |
| CN | 113597602 A | 11/2021 |
| WO | 2020217121 A1 | 10/2020 |

OTHER PUBLICATIONS

Examination Report, Patents Act 1977: Examination Report under Section 18(3), Application No. GB2115690.6, Dated Aug. 23, 2022, 6 pages.

"Intent Detection", Kore.ai Documentation, Nov. 24, 2018, pp. 1-7, Kore.ai, Inc., Published at: https://developer.kore.ai/docs/bots/natural-language-processing-nlp-guide/intent-detection/.

Author Unknown, Bag-of-words model, Wikipedia, Oct. 13, 2018, pp. 1-5, Wikimedia Foundation, Inc., Published at: https://en.wikipedia.org/wiki/Bag-of-words_model.

Author Unknown, Cosine similarity, Wikipedia, Mar. 3, 2019, pp. 1-6, Wikimedia Foundation, Inc., Published at: https://en.wikipedia.org/wiki/Cosine_similarity.

Author Unknown, Gaussian Noise, Wikipedia, Mar. 8, 2019, pp. 1-2, Wikimedia Foundation, Inc., Published at: https://en.wikipedia.org/wiki/Gaussian_noise.

Author Unknown, Long short-term memory, Wikipedia, Mar. 11, 2019, pp. 1-11, Wikimedia Foundation, Inc., Published at: https://en.wikipedia.org/wiki/Long_short-term_memory.

Author Unknown, tf-idf, Wikipedia, Mar. 11, 2019, pp. 1-6, Wikimedia Foundation, Inc., Published at: https://en.wikipedia.org/wiki/Tf%E2%80%93idf.

Author Unknown, Word embedding, Wikipedia, Feb. 12, 2019, pp. 1-5, Wikimedia Foundation, Inc., Published at: https://en.wikipedia.org/wiki/Word_embedding.

Homa B. Hashemi, et al., "Query Intent Detection Using Convolutional Neural Networks", QRUMS Workshop, In Proceedings of 2016 International Conference on Web Search and Data Mining, Feb. 22, 2016, pp. 1-19, Association for Computing Machinery, Published at: http://people.cs.pitt.edu/~hashemi/papers/QRUMS2016_slides.pdf.

International Search Report and Written Opinion, International Application No. PCT/IB2020/053124, International Filing Date Apr. 2, 2020, 9 pages.

Joo-Kyung Kim et al., "Intent Detection Using Semantically Enriched Word Embeddings", Sep. 2016, pp. 1-6, Microsoft Corporation, Published at: http://www.microsoft.com/en-us/research/wp-content/uploads/2016/09/intent-detection-semantically.pdf.

* cited by examiner

INTENT RECOGNITION MODEL CREATION FROM RANDOMIZED INTENT VECTOR PROXIMITIES

BACKGROUND

The field of the invention is related to cognitive intent recognition applications, such as chatbots, that utilize intent recognition models to infer intent of a user that speaks a sentence or command. For example, a user may ask "where can I find coffee?," and the cognitive intent recognition application attempts to infer from the intent recognition model that the user would like directions to a coffee shop.

However, problems exist with conventional creation of intent recognition models because of the complexities of natural language (NL) variations that exist for expressing ideas and intentions in virtually every different language and across different regions in which languages are used. For example, certain conventional approaches generate "semantically similar sentences" by determining "for each word in an input utterance a set of corresponding semantically similar words." However, for any given word, multiple such semantically similar words (e.g., synonyms) may exist, and considerably different sentences or phrases may be used to convey similar meanings. A result of these types of language complexities is a vast set of permutations of word and phrase combinations that are usable to express ideas. As a further consequence, large amounts of training data in the form of high-quality sentence/phrase input variations are required to accurately train conventional intent recognition models. Conventional creation of intent recognition models is thereby a manually intensive process of collecting and filtering input variations from a variety of different input sources. Language experts are then employed to generate reasonable and meaningful sentence/phrase variations using synonyms as seed text for the intent recognition model generation and training. The amount of data provided and the generated phrase variations determine the quality of the intent recognition model. However, very few conventional intent recognition models are prepared using the requisite number of high-quality sentence/phrase input variations. As a result, conventional intent recognition models are inadequately created and are inadequately trained, and conventional intent recognition models are thereby ineffective at properly identifying intent of a user across all of the natural language variations and sentence formats for expressing ideas and intentions in any given language.

A long short-term memory (LSTM) is an artificial recurrent neural network (RNN) architecture used in computer-based deep learning processing. LSTM has feedback connections that allow processing of sequences of data, such as speech or video, in addition to processing of single data points.

A sentence vector is formed using word embeddings to represent words. A sentence vector is constructed by use of a neural network that recursively combines word embeddings within a generative model, such as recursive/recurrent Neural Net or using some other non-neural network algorithm (e.g., doc2vec). A sentence vector generally has a similar shape when compared to word embeddings.

Gaussian noise is a form of statistical noise that has a probability density function (PDF) equivalent to a normal distribution, which is alternatively termed a Gaussian distribution. Gaussian noise is modeled using random variables in fields such as telecommunications and computer networking to model the effects of noise coming from natural sources that affect those telecommunications and computer networking systems. These natural sources that affect those telecommunications and computer networking systems include, among others, thermal vibrations of atoms in conductors, and radiation from celestial bodies (e.g., from the Earth, from the Sun, etc.).

SUMMARY

A computer-implemented method includes generating, from an input intent vector, a set of candidate intent vectors. The computer-implemented method includes performing a validation of the set of candidate intent vectors that selects as valid intent vectors any of the set of candidate intent vectors that are semantically similar to the input intent vector. This embodiment has an advantage of improving intent recognition model creation and validation by relying upon fewer sentence/phrase inputs, and by autonomously deriving a robust intent recognition model with increased intent inference accuracy.

A system that performs the computer-implemented method and a computer program product that causes a computer to perform the computer-implemented method are also described.

A permissive embodiment involves generating the set of candidate intent vectors by iteratively processing the input intent vector in parallel with a noise vector such that each candidate intent vector of the set of candidate intent vectors is randomly distributed relative to the input intent vector, which has an advantage of much faster intent recognition model creation than possible using conventional technologies.

A permissive embodiment involves generating the set of candidate intent vectors by processing the input intent vector in parallel with a noise vector within a long short-term memory (LSTM) model, which has an advantage of much more accurate intent recognition model creation than possible using conventional technologies.

A permissive embodiment involves performing the validation of the set of candidate intent vectors by determining a multi-dimensional intent vector distance between the input intent vector and the respective candidate intent vector and selecting candidate intent vectors that are within a configured multi-dimensional intent vector distance of the input intent vector as the valid intent vectors that are semantically similar to the input intent vector, which has an advantage of identifying candidate vectors that are proximate in a multi-dimensional vector space relative to the sample intent vector and thereby similar intent vector encodings.

A permissive embodiment involves at least one of generating and performing the validation as a service in a cloud environment, which has an advantage of rapid deployment and serviceability of intent recognition model creation technology described herein.

A permissive embodiment involves creating an intent recognition model from the valid intent vectors that are semantically similar to the input intent vector, which has an advantage of rapid creation of an intent recognition model from validated intent vectors.

A permissive embodiment involves performing candidate intent vector generation feedback from the validation to the generating that adjusts vector generation parameters used to generate candidate intent vector in response to determining during the validation that a generated candidate intent vector is not semantically similar to the input intent vector, and iteratively adjusting the vector generation parameters by use of the candidate intent vector generation feedback until a resulting generated candidate intent vector is semantically similar to the input intent vector, which has an advantage of increasing a percentage of high-quality candidate intent vectors that are computer generated, which improves computing speed of intent recognition model creation and improves accuracy of resulting intent recognition model.

DETAILED DESCRIPTION

Figure 1:
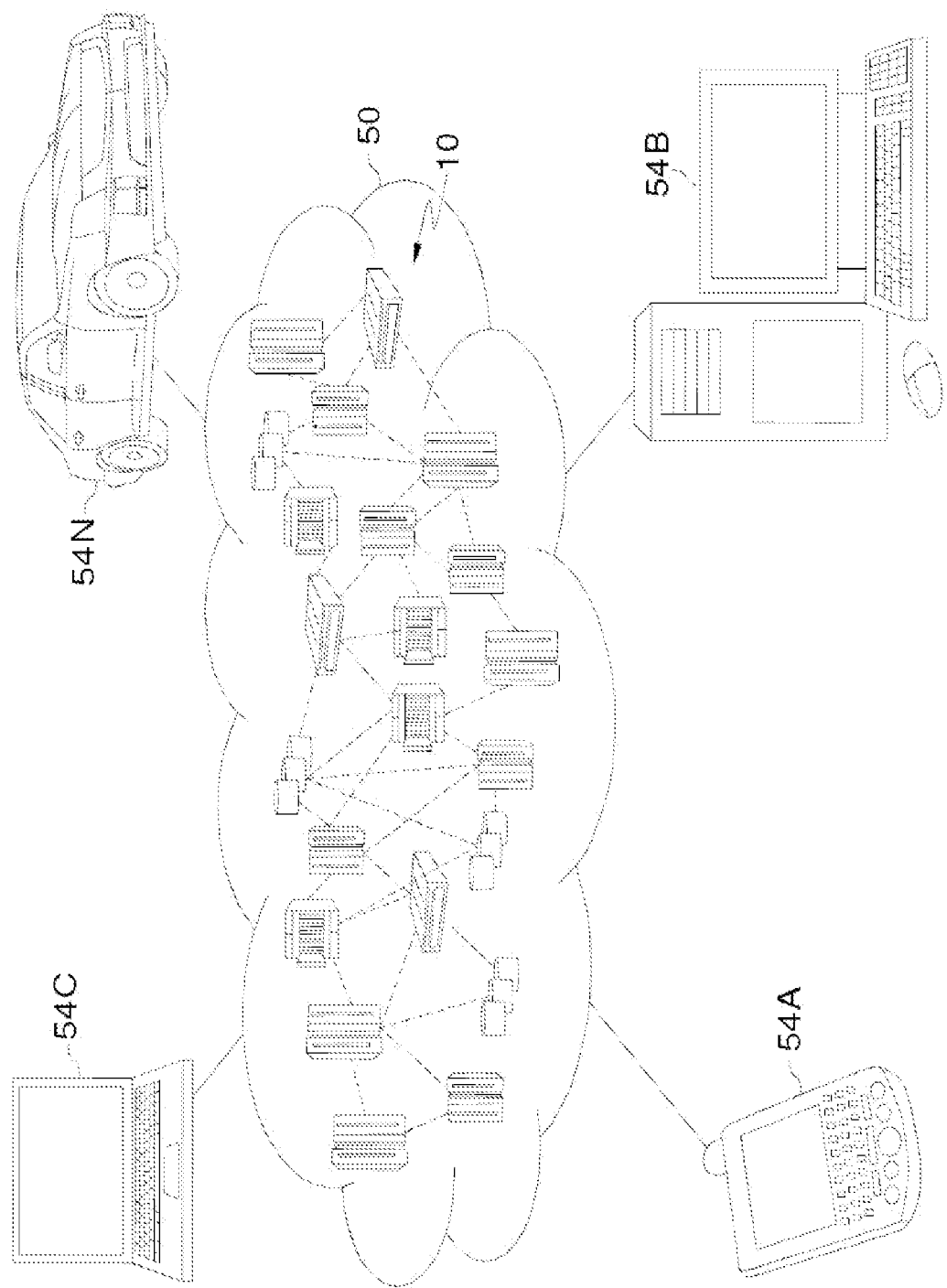
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides intent recognition model creation from randomized intent vector proximities. The present technology solves a recognized intent recognition model creation problem by providing technology that includes a new form of autonomous computer-controlled creation and validation of sentence/phrase vectors that improve both speed of intent recognition model creation and accuracy of intent recognition model functionality relative to conventional intent recognition models. The technology described herein is based upon computer-controlled processing of limited sentence/phrase input variation(s), and as a result requires much less input data to create much more accurate intent recognition models relative to the conventional intent recognition models.

Some embodiments of the present invention may include one, or more, of the following features, characteristics operations and/or advantages: (i) combines noise with a sentence (sample) vector to generate many candidate vectors; (ii) uses a long short-term memory (LSTM) model with feedback to facilitate computer generation of large numbers of candidate vectors that jitter around the initial sample vector; (iii) uses post-Gaussian vectors that are close in the resulting vector space to identify spoken phrases (once also converted to vectors) with intent similar to the phrase encoded into the initial sample vector without use of conventional synonym-based vector encoding; (iv) accounts for variations in use of language, including dialects and regional language variations; and/or (v) improves intent recognition in at least this aspect because conventional synonym-based vector encoding may not be capable of identifying intent from a phrase spoken using these types of variations of spoken/encoded words.

The technology described herein operates based upon an observation that the vector distance between encoded intent vectors that have the same or similar meanings is very close in a multi-dimensional intent vector space. As a result of this observation, it was determined that the distance between intent vectors can be utilized to represent similarity of meanings of different vector-encoded sentences or phrases and that, by randomly varying an intent vector itself, more accurate intent recognition models are created relative to conventional input text variations. The technology described herein completely changes intent recognition model creation, and the resulting/created intent recognition models significantly improves computer-based recognition of a user's intent.

Based upon the use of distance between intent vectors, the technology described herein computer-generates a large number of validated encoded intent vectors to train and form an intent recognition model. As such, the technology described herein provides large scale, more rapid, and more accurate creation of intent recognition models using less input data than was previously possible using conventional manual creation of semantically similar sentences by use of synonyms and word choice variations, with subsequent encoding of those similar sentences.

The technical processing described herein takes as input one version of a sample intent text, in the form of a sentence or phrase, that is representative of intent to be encoded into an intent recognition model. The processing then converts and encodes the sample intent text into a sample intent vector using a digital encoding method convenient for the processing platform. The conversion of the sample intent text into the sample intent vector can be performed by any processing appropriate for a given implementation, such as frequency domain encoding (e.g., Fast Fourier Transform, etc.) or other form of encoding, with each word or utterance represented in a digital form usable to uniquely identify the respective word or utterance. A computer-based intent vector generator automatically generates a large number of candidate intent vectors from the sample intent vector for evaluation of a multi-dimensional vector distance relative to the sample intent vector. To improve accuracy, a computer-based vector validator filters valid and meaningful candidate intent vectors, that are close in multi-dimensional vector distance (e.g., matrix-dimensional cosine similarity, where the number of dimensions evaluated for cosine similarity equals the vector matrix dimensions) to the sample intent vector, into a final set of similar intent vectors, while discarding any candidate intent vectors that are not similar in multi-dimensional vector distance to the sample intent vector (e.g., not close in matrix-dimensional cosine similarity). The final set of similar intent vectors is used to train the intent recognition model. As such, the technology described herein improves speed and accuracy of computer-based creation of the intent recognition model, and additionally improves speed and accuracy of computer-based intent recognition when the intent recognition model is deployed. As a further result, the technology described herein operates on a large scale with significantly reduced data input requirements relative to conventional forms of intent recognition model creation. Specifically, in contrast to conventional synonym-based approaches, the technology described herein utilizes a single sample input text to create an intent recognition model that is capable of determining intent across a variety of variations of user input phrases that express an intent similar to the sample input text.

To encode the sample intent vector, the sample intent text phrase is digitized according to a configurable/specified dimensionality. For purposes of example, a dimensionality of three hundred (dimension=300) may be specified, though other dimensions such as two hundred fifty-six (dimension=256) may be used as appropriate for a given implementation. Continuing with the dimensionality of three hundred (dimension=300) for purposes of example, each word of sample input text may be converted into a 300-dimension vector that includes 300 digital values that represent the specific word. With a sample input text phrase of four (4) words, the digital representation of the sample input text phrase results in a matrix of four (4) such 300-dimension vectors (e.g., a matrix of 4×300 digital values) that encode the phrase.

This resulting matrix of digital values is then entered into a "convolutional neural network" model, and an intermediate result after maximum-pooling layer processing is selected as the sample intent vector. The sample intent vector thus obtained has semantics of the sample intent text phrase represented digitally in the multi-dimensional intent vector space.

To further detail the maximum-pooling layer processing in the convolutional neural network algorithm, the representation of the entire sample input text/phrase is abstracted into a single/resulting sample intent vector. This single vector may be used as the representation of the semantics of the sample input text/phrase in the semantic vector space. Generally, a type (n) of a convolution kernel and a number of convolution kernels (m) of each kind are jointly determined (n*m). Within the example above, the dimension of the resulting sample intent vector is also three hundred (300) dimensions, where the type (n) has been set to three (n=3) and the number of convolutional kernels (m) has been set to one hundred (m=100). However, it should be noted that the number of convolutional kernels may alternatively be set to four hundred (400), five hundred (500), or any other value appropriate for a given implementation.

The computer-based intent vector generator generates a configurable number of candidate intent vectors from the sample intent vector by varying the individual elements of the sample intent vector. The candidate intent vectors are then evaluated/validated for multi-dimensional vector distance relative to the sample intent vector. For purposes of example, the number of candidate intent vectors to be generated and validated may be set to one thousand and twenty-four (1,024), though the configured number of candidate intent vectors to be generated and validated may be set to any number as appropriate for a given implementation (e.g., 2,048, 4,096, etc.).

To further improve probabilistic accuracy of the generated candidate intent vectors, the computer-based intent vector generator utilizes a randomly-generated noise vector with elements that each have a Gaussian (e.g., normal) distribution across frequencies for each element (e.g., word/utterance) of the sample intent vector. The addition of Gaussian noise to a sample vector randomly distributes each generated vector in a semantic space around the sample vector. As such, while the generated vectors do not directly correspond to vocabulary in a real language, the generated vectors have tangible meaning in the semantic space that is usable as described herein to formulate improved and more accurate intent recognition models. In this embodiment, the computer-based intent vector generator processes the sample intent vector repeatedly and in parallel with the randomly-generated Gaussian noise vector within a "long short-term memory" (LSTM) model, and obtains for each iteration a post-Gaussian (candidate) intent vector. As such, the LSTM model processing results in a very large and configurable number of post-Gaussian candidate intent vectors.

Continuing with this embodiment, the computer-based intent vector validator receives the generated post-Gaussian candidate intent vectors, and each post-Gaussian candidate intent vector is input into an intention recognition algorithm. A given post-Gaussian candidate intent vector is considered for acceptance as a valid/final intent vector of the intent recognition model by first measuring a difference between the sample input vector and the respective post-Gaussian candidate intent vector to obtain a vector distance as a measure of loss or change relative to the sample input vector in the form of error (e.g., fifteen percent 15% loss). The measure of loss can then be inverted to obtain a confidence level regarding similarity of intent of the respective post-Gaussian candidate intent vector to the sample intent vector. For purposes of example, a multi-dimensional vector distance of zero point eight five (0.85) results in a confidence level of eighty-five percent (85%). Further, a confidence level of eighty-five percent (85%) or higher (e.g., closer multi-dimensional vector distance approaching 1.0) may be used to consider a respective post-Gaussian candidate intent vector as representing a valid similar intent as the sample intent vector, though it should be understood that any other confidence level may be utilized as appropriate for a given implementation.

An intent vector generation feedback loop from the intent vector validator to the intent vector generator and LSTM model is utilized to train the intent vector generator according to the determined error/measure of loss. LSTM parameters are iteratively updated throughout this feedback process to improve the intent vector generation for each candidate intent vector generated and for additional candidate intent vector processing over time. This iterative and feedback training process is repeated until the output post-Gaussian candidate intent vectors generated by the intent vector generator consistently pass the intent vector validator and are considered valid/final intent vectors of the intent recognition model.

Accordingly, the processing described herein programmatically self-adjusts the intent vector generation to ensure that a higher percentage of valid intent vectors result from the computer-controlled and automated intent vector generation processing. This higher percentage of valid intent vectors is then used to rapidly create and train the intent recognition model with a contemporaneous high degree of confidence that the intent recognition model, when deployed, accurately determines a user's intent across a variety of phrases that represent intent similar to the sample input text.

Specifically, the large number of valid/final intent vectors that are programmatically generated and validated within the deployed intent recognition model are considered to form an intent vector space or random distribution that statistically spans a multi-dimensional vector-space region around the original sample intent vector. As such, when a phrase is spoken by a given user of the deployed intent recognition model, that phrase is digitized and if the digitized representation of the phrase spoken by the user is proximate to or within the multi-dimensional vector-space region created by the set of valid/final intent vectors, then the phrase spoken by the user is mapped back to the sample intent vector, and from there mapped back to the original sample intent text to determine the user's intent. It should be noted that, because of the proximity of intent vectors that represent similar intents as described above, an accurate interpretation of the user's intent can be determined rapidly and in real time even where the particular phrase spoken by the user was not encoded into a final intent vector in the intent recognition model. As such, the technology described herein expands the set of phrases for which intent can be determined without requiring individual encoding of each possible variation of phrases as would have been required by conventional technologies to identify individual phrases. In this way, the technology described herein improves accuracy of deployed intent recognition models with limited sentence/phrase input variation(s), and is thereby considered a significant improvement over conventional intent recognition model technologies.

Some terminology used in describing embodiments of the present invention will now be explained. A "natural language" is hereby defined as a recognizable spoken language or a dialect that is spoken by persons in one or more regions, and may include formal languages such as Chinese, English, French, German, and other languages or dialects that are regional variants of such languages. A "convolutional neural network" is hereby defined as a computing model capable of being executed to convert spoken text into one or more sequences of data elements. The data elements digitally represent phrases or sentences of the spoken text as a multi-dimensional matrix, and are processed in matrix form within a digital computing device. An "intent vector element" is hereby defined as one spoken word or utterance that has been digitally encoded into a multi-dimensional vector that represents and distinguishes the spoken word or utterance for processing as a digital data element. An "intent vector" is alternatively termed a "sentence vector" herein, and is hereby defined as a sequence of intent vector elements that encode a sentence or phrase of speech into a multi-dimensional matrix, and that are processed as a matrix/unit of data as described herein. A "sample intent vector" is alternatively termed a "sample sentence vector" herein, and is hereby defined as an intent vector generated from sample text phrase by recursively combining word embeddings within a generative model into a vector format that is used as an initial/starting input for intent/sentence vector generation and validation processing, as described herein. "Gaussian noise" is hereby defined as noise that has a standard/normal distribution across frequencies relative to a mean or average set of values. A "Gaussian noise intent vector" is hereby defined as a matrix of data elements that each represent one distribution of Gaussian noise relative to a set of elements represented within a particular intent vector. A "post-Gaussian intent vector" is alternatively termed a "candidate intent vector" herein, and is hereby defined as a resulting matrix of encoded data elements that are output from parallel processing of an intent vector and a Gaussian noise intent vector, where each resulting encoded data element encodes a statistical variation of the respective/paired intent vector element of the intent vector according to the normal distribution provided by Gaussian noise represented within the sequence of data elements of the Gaussian noise intent vector. A "long short-term memory" (LSTM) is hereby defined as a computer processing network capable of parallel processing of intent vectors and Gaussian noise intent vectors as single units of input, and that provides as output post-Gaussian intent vectors. A "multi-dimensional vector distance" is hereby defined as a vector distance between a sample intent vector and a candidate intent vector calculated according to the number of dimensions of the intent vector matrices of the respective intent vectors. A "matrix-dimensional cosine similarity" is hereby defined as a form of multi-dimensional vector distance that identifies a cosine similarity calculated across the number of dimensions of the intent vector matrices of the respective intent vectors. A "validated intent vector" is defined herein to be a candidate intent vector that has been validated to be within a configured multi-dimensional vector distance of a given sample sentence vector from which the respective post-Gaussian/candidate intent vector was generated. A "validated intent recognition model" is defined herein to be an intent recognition model defined using automatically-generated and validated intent vectors, as defined and described herein.

The technology described herein operates by generating, from an input intent vector, a set of candidate intent vectors, and performing a validation of the set of candidate intent vectors that selects as valid intent vectors any of the set of candidate intent vectors that are semantically similar to the input intent vector. This embodiment has an advantage of improving intent recognition model creation and validation by relying upon fewer sentence/phrase inputs, and by autonomously deriving a robust intent recognition model with increased intent inference accuracy.

Certain advantages of certain embodiments of the present subject matter will now be described. An embodiment where the generating of the set of candidate intent vectors is performed by iteratively processing the input intent vector in parallel with a noise vector such that each candidate intent vector of the set of candidate intent vectors is randomly distributed relative to the input intent vector has an advantage of much faster intent recognition model creation than possible using conventional technologies. An embodiment where the generating of the set of candidate intent vectors is performed by processing the input intent vector in parallel with a noise vector within a long short-term memory (LSTM) model has an advantage of much more accurate intent recognition model creation than possible using conventional technologies. An embodiment where the performing of the validation of the set of candidate intent vectors involves determining a multi-dimensional intent vector distance between the input intent vector and the respective candidate intent vector and selecting candidate intent vectors that are within a configured multi-dimensional intent vector distance of the input intent vector as the valid intent vectors that are semantically similar to the input intent vector has an advantage of identifying candidate vectors that are proximate in a multi-dimensional vector space relative to the sample intent vector and thereby similar intent vector encodings. An embodiment that involves at least one of generating and performing the validation as a service in a cloud environment has an advantage of rapid deployment and serviceability of intent recognition model creation. An embodiment that involves creating an intent recognition model from the valid intent vectors that are semantically similar to the input intent vector has an advantage of rapid creation of an intent recognition model from validated intent vectors. An embodiment that involves performing candidate intent vector generation feedback from the validation to the generating that adjusts vector generation parameters used to generate candidate intent vector in response to determining during the validation that a generated candidate intent vector is not semantically similar to the input intent vector and iteratively adjusting the vector generation parameters by use of the candidate intent vector generation feedback until a resulting generated candidate intent vector is semantically similar to the input intent vector has an advantage of increasing a percentage of high-quality candidate intent vectors that are computer generated, which improves computing speed of intent recognition model creation and improves accuracy of resulting intent recognition model.

It should be noted that conception of the present subject matter resulted from recognition of certain limitations associated with intent recognition model creation. For example, it was observed that creation of a robust intent recognition model would require significant amounts of data in the form of validated and high-quality sentence/phrase inputs, but that validated and high-quality sentence/phrase inputs are not generally available to persons tasked with the creation of intent recognition models. It was further observed that, as a consequence of limited available input data, intent recognition models have a high rate of error with respect to the intent that is inferred from a user's statement/question relative to the actual intent of the user. It was determined from these observations that new computing technology was needed to improve intent recognition model creation and validation that relies upon fewer sentence/phrase inputs, and that autonomously derives a robust intent recognition model with increased intent inference accuracy relative to conventional forms of intent recognition model creation. The present subject matter described herein improves intent recognition model creation and validation by providing for intent recognition model creation from randomized intent vector proximities, as described above and in more detail below. As such, improved intent recognition model creation and validation are obtained through use of the present technology.

The intent recognition model creation from randomized intent vector proximities described herein can be performed in real time to allow prompt creation and validation of intent recognition models. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

The following Table 1 shows one example of a portion of an encoded 300-dimension sample intent vector based upon the input text/phrase "I can't breathe, is this a symptom of chronic rhinitis?" The following Table 1 omits many intermediate values by use of ellipsis dots to reduce the length of the example. However, it should be understood that the encoded 300-dimension sample intent vector from which the example of Table 1 was formed included three hundred (300) elements because, as described above and for purposes of example, the type (n) has been set to three (n=3) and the number of convolutional kernels (m) has been set to one hundred (m=100) in the convolutional neural network algorithm used to encode the sample intent vector.

TABLE 1

Portion of a 300-Dimension Sample Intent Vector

| | | | | | |
|---|---|---|---|---|---|
| 0.06217742 | −0.09291203 | −0.02840577 | 0.00374683 | −0.10506968 | −0.13434719 |
| −0.15676261 | 0.04667582 | 0.19579822 | 0.04030076 | −0.21957162 | 0.04010129 |
| 0.07424975 | 0.01369099 | 0.07016561 | 0.14306846 | −0.08841907 | −0.28088206 |
| −0.23514667 | −0.01831863 | −0.00475325 | −0.0811624 | −0.37781501 | −0.17635982 |
| −0.00429389 | 0.05205948 | −0.03414214 | −0.11769973 | −0.02660859 | 0.16670637 |
| 0.07024501 | 0.25753206 | 0.01059075 | −0.12026082 | −0.22058713 | 0.06767957 |
| . . . | . . . | . . . | . . . | . . . | . . . |
| 0.10361771 | 0.09943719 | 0.32700372 | −0.0283169 | 0.12805387 | 0.01565604 |

Based upon the example of Table 1 above, it should further be noted that multiple candidate intent vectors generated according to the technology described herein would each also be represented as a 300-dimension candidate intent vector, where individual elements of the respective candidate intent vector can be randomly changed relative to the respective individual element of the sample intent vector. The example of Table 1 above provides sufficient detail regarding formation of a sample intent vector and candidate intent vectors as described herein, and additional examples of numeric encoding patterns of intent vectors are omitted for brevity herein. As described above, multi-dimensional vector distance calculations are applied to determine a relative vector-space distance between the sample intent vector and each generated candidate intent vector to perform the validation described herein.

Additional details of the algorithmic processing and computational efficiencies will be provided further below. The following portion of the present description provides examples of advanced computational platform(s) within which the present technology may be implemented, followed by further details of the intent recognition model creation from randomized intent vector proximities described herein.

It should be noted that the present technology may be implemented within or as part of a cloud computing environment (e.g., for data analytics), or may be implemented as a customized environment-specific solution. As such, examples of implementations for both environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
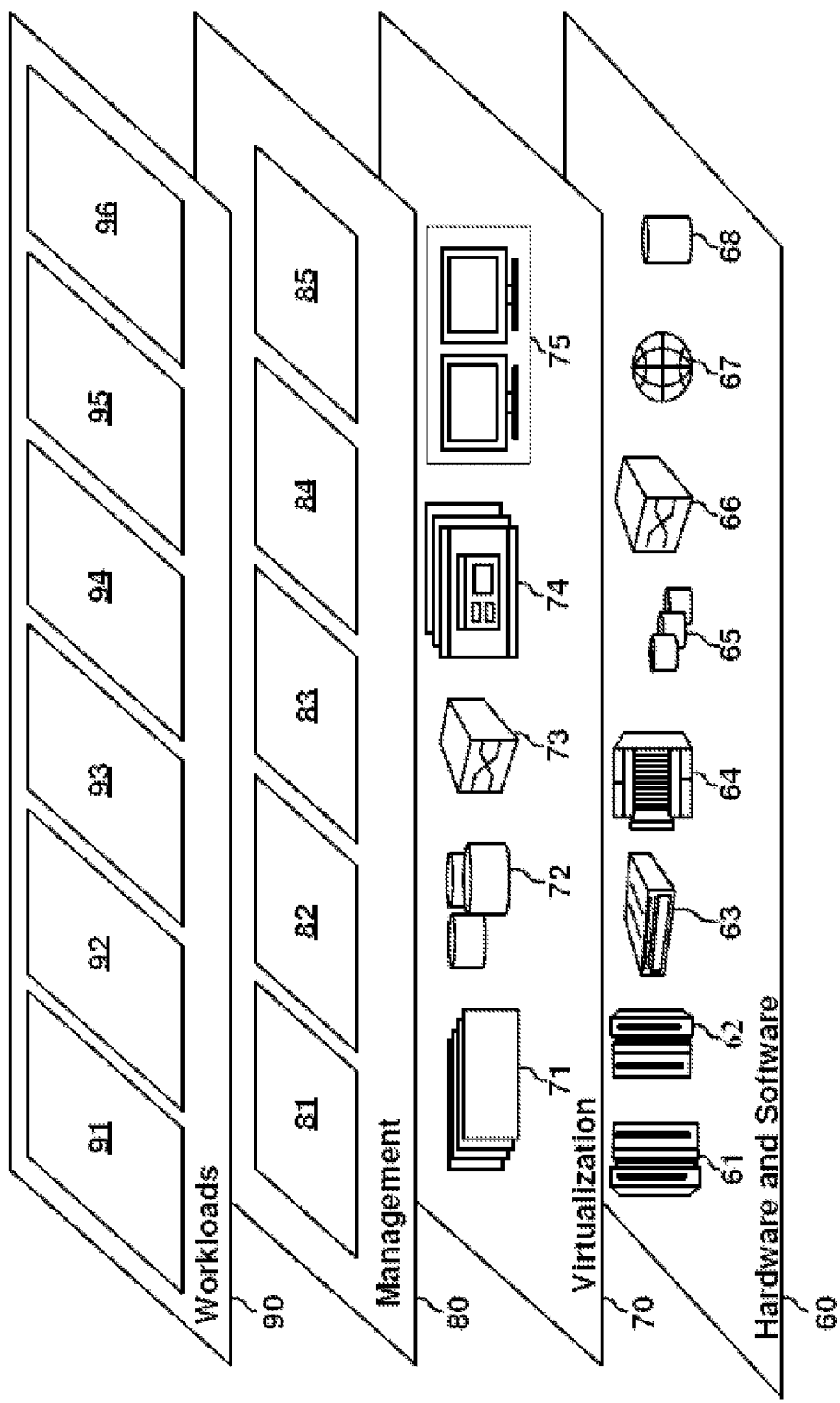
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intent recognition model creation from randomized intent vector proximities 96.

Within the examples above, the cloud computing environment illustrates several types of computing devices 54A-N upon which virtual agents may be deployed and managed. Regarding alternative implementation options, FIGS. 3 and 4 below are directed to such alternatives. It should be understood that the various alternatives may be combined with or substituted with the implementation options described above, as appropriate for the given implementation.

Figure 3:
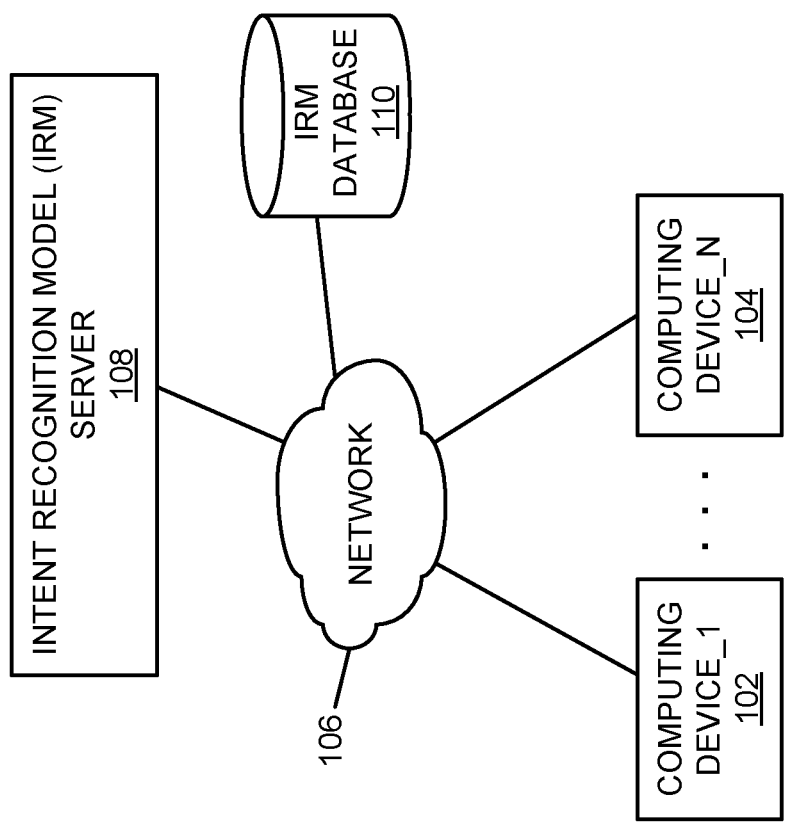
FIG. 3 is a block diagram of an example of an implementation of a system for intent recognition model creation from randomized intent vector proximities according to an embodiment of the present subject matter.

FIG. 3 is a block diagram of an example of an implementation of a system 100 for intent recognition model creation from randomized intent vector proximities. A computing device_1 102 through a computing device_N 104 communicate via a network 106 with several other devices. The computing device_1 102 through the computing device_N 104 represent user devices that utilize one or more intent recognition models for user interface and device control processing. However, it should be noted that the computing device_1 102 through the computing device_N 104 may additionally/alternatively implement the automated intent recognition model creation from randomized intent vector proximities described herein. As an additional alternative, an intent recognition model (IRM) server 108 can serve the computing device_1 102 through the computing device_N 104 by generating and validating one or more intent recognition models according to the automated intent recognition model creation from randomized intent vector proximities described herein. As appropriate for the given implementation, the IRM server 108, or one or more of the computing device_1 102 through the computing device_N 104, can store one or more validated intent recognition models either locally or within an intent recognition model (IRM) database 110 for access and use within the system 100.

In view of the implementation alternatives described above, the present technology can be implemented within a cloud computing platform, at a user computing device, at a server device level, or by a combination of such platforms and devices as appropriate for a given implementation. A variety of possibilities exist for implementation of the present subject matter, and all such possibilities are considered within the scope of the present subject matter.

The network 106 includes any form of interconnection suitable for the intended purpose, including a private or public network such as an intranet or the Internet, respectively, direct inter-module interconnection, dial-up, wireless, or any other interconnection mechanism capable of interconnecting the respective devices.

The IRM server 108 includes any device capable of providing data for consumption by a device, such as the computing device_1 102 through the computing device_N 104, via a network, such as the network 106. As such, the IRM server 108 can include a web server, application server, or other data server device.

The IRM database 110 includes a relational database, an object database, or any other storage type of device. As such, the IRM database 110 may be implemented as appropriate for a given implementation.

Figure 4:
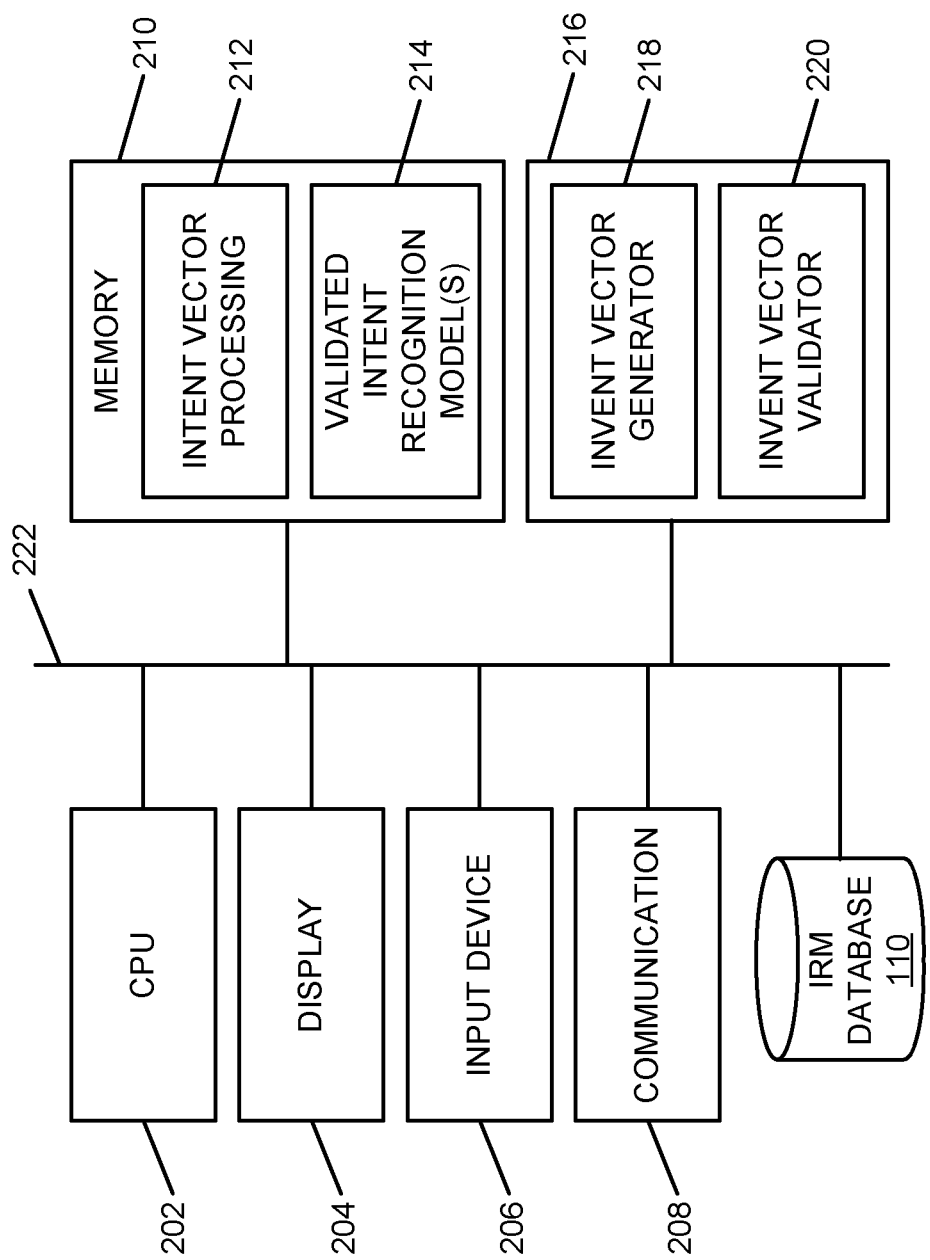
FIG. 4 is a block diagram of an example of an implementation of a core processing module capable of performing intent recognition model creation from randomized intent vector proximities according to an embodiment of the present subject matter.

FIG. 4 is a block diagram of an example of an implementation of a core processing module 200 capable of performing intent recognition model creation from randomized intent vector proximities. The core processing module 200 can be associated with either the computing device_1 102 through the computing device_N 104 or with the IRM server 108, or with devices within the cloud computing environment 50, as appropriate for a given implementation. As such, the core processing module 200 is described generally herein, though it is understood that many variations on implementation of the components within the core processing module 200 are possible and all such variations are within the scope of the present subject matter. Further, the core processing module 200 can be implemented as an embedded processing device with circuitry designed specifically to perform the processing described herein, as appropriate for a given implementation.

The core processing module 200 can provide different and complementary processing of intent recognition model creation from randomized intent vector proximities in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor" or "application-specific" processor) provides hardware that performs computer instruction execution, computation, and other capabilities within the core processing module 200. A display 204 provides visual information to a user of the core processing module 200 and an input device 206 provides input capabilities for the user.

The display 204 includes any display device, such as a cathode ray tube (CRT), liquid crystal display (LCD), light emitting diode (LED), electronic ink displays, projection, touchscreen, or other display element or panel. The input device 206 includes a computer keyboard, a keypad, a mouse, a pen, a joystick, touchscreen, voice command processing unit, or any other type of input device by which the user can interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 can operate as a completely automated embedded device without direct user configurability or feedback. However, the core processing module 200 can also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100, or within the cloud computing environment 50, as appropriate for a given implementation. The communication module 208 includes any electrical, protocol, and protocol conversion capabilities useable to provide interconnection capabilities, as appropriate for a given implementation. As such, the communication module 208 represents a communication device capable of carrying out communications with other devices. The communication module 208 can further include one or more wireless communication capabilities, as appropriate for the given implementation.

A memory 210 includes an intent vector processing and storage area 212 that stores intent vector processing information within the core processing module 200. As will be described in more detail below, intent vector processing information stored within the intent vector processing and storage area 212 is used to rapidly (in real time) generate high-quality intent recognition models based upon limited sentence/phrase input variation(s). As such, the intent vector processing and storage area 212 stores sample intent vectors, Gaussian noise vectors, one or more sets of post-Gaussian/candidate intent vectors, and validated intent vectors that have been validated to be within a configured multi-dimensional vector distance of a given sample intent vector. Processing to create one or more validated intent recognition models can be performed within the memory 210. A validated intent recognition model(s) storage area 214 provides storage for one or more validated intent recognition models generated from validated intent vectors. Validated intent recognition models can be deployed/distributed or used from within the validated intent recognition model(s) storage area 214. Many other forms of intermediate information can be stored in association with creation and validation of validated intent recognition models within the validated intent recognition model(s) storage area 214, as appropriate for a given implementation.

It is understood that the memory 210 includes any combination of volatile and non-volatile memory suitable for the intended purpose, distributed or localized as appropriate, and may include other memory segments not illustrated within the present example for ease of illustration purposes. For example, the memory 210 can include a code storage area, an operating system storage area, a code execution area, and a data area without departure from the scope of the present subject matter.

An intent vector creation and proximity validation module 216 is also illustrated. The intent vector creation and proximity validation module 216 includes an intent vector generator module 218 that provides randomized post-Gaussian/candidate intent vector generation. The intent vector creation and proximity validation module 216 also includes an intent vector validator module 220 that provides validation of proximities of generated candidate intent vectors to sample intent vectors for the core processing module 200, as described above and in more detail below. The intent vector creation and proximity validation module 216 implements the automated intent recognition model creation from randomized intent vector proximities of the core processing module 200 by performing sample intent vector encoding, candidate intent vector generation, validation of candidate intent vectors, generation of validated intent recognition models, and other related processing as appropriate for a given implementation.

It should also be noted that the intent vector creation and proximity validation module 216 can form a portion of other circuitry described without departure from the scope of the present subject matter. The intent vector creation and proximity validation module 216 can form a portion of an interrupt service routine (ISR), a portion of an operating system, or a portion of an application without departure from the scope of the present subject matter. The intent vector creation and proximity validation module 216 can also include an embedded device with circuitry designed specifically to perform the processing described herein as appropriate for a given implementation.

The IRM database 110 is again shown within FIG. 4 associated with the core processing module 200. As such, the IRM database 110 can be operatively coupled to the core processing module 200 without use of network connectivity, as appropriate for a given implementation, and can be used in association with the core processing module 200 for creation or use of one or more validated intent recognition models.

The CPU 202, the display 204, the input device 206, the communication module 208, the memory 210, the intent vector creation and proximity validation module 216, and the IRM database 110 are interconnected via an interconnection 222. The interconnection 222 includes a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules include any hardware, programmed processor(s), and memory used to carry out the functions of the respective modules as described above and in more detail below. For example, the modules can include additional controller circuitry in the form of application specific integrated circuits (ASICs), processors, antennas, and/or discrete integrated circuits and components for performing communication and electrical control activities associated with the respective modules. Additionally, the modules can include interrupt-level, stack-level, and application-level modules as appropriate. Furthermore, the modules can include any memory components used for storage, execution, and data processing for performing processing activities associated with the respective modules. The modules can also form a portion of other circuitry described or may be combined without departure from the scope of the present subject matter.

Additionally, while the core processing module 200 is illustrated with and has certain components described, other modules and components can be associated with the core processing module 200 without departure from the scope of the present subject matter. Additionally, it should be noted that, while the core processing module 200 is described as a single device for ease of illustration purposes, the components within the core processing module 200 can be co-located or distributed and interconnected via a network without departure from the scope of the present subject matter. Many other possible arrangements for components of the core processing module 200 are possible and all are considered within the scope of the present subject matter. It should also be understood that, though the IRM database 110 is illustrated as a separate component for purposes of example, the information stored within the IRM database 110 can also/alternatively be stored within the memory 210 without departure from the scope of the present subject matter. Accordingly, the core processing module 200 can take many forms and can be associated with many platforms.

Figure 5:
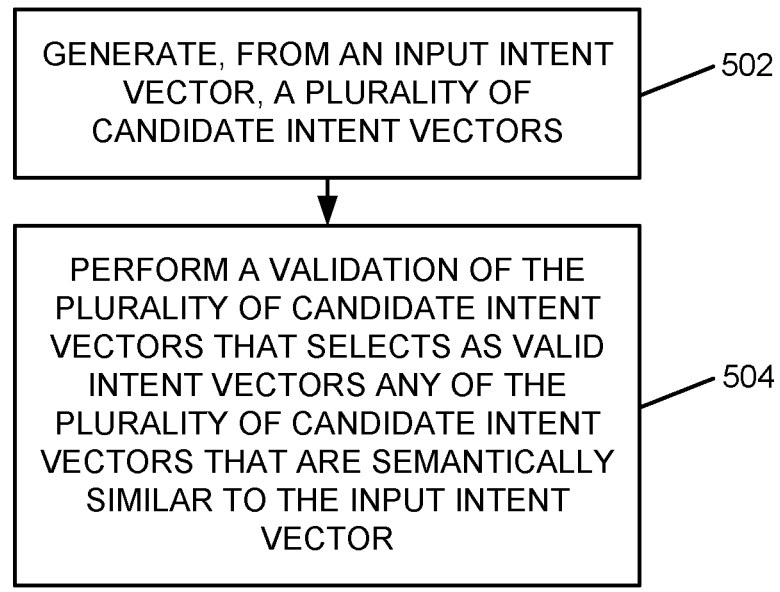
FIG. 5 is a flow chart of an example of an implementation of a process for automated intent recognition model creation from randomized intent vector proximities according to an embodiment of the present subject matter.
Figure 6:
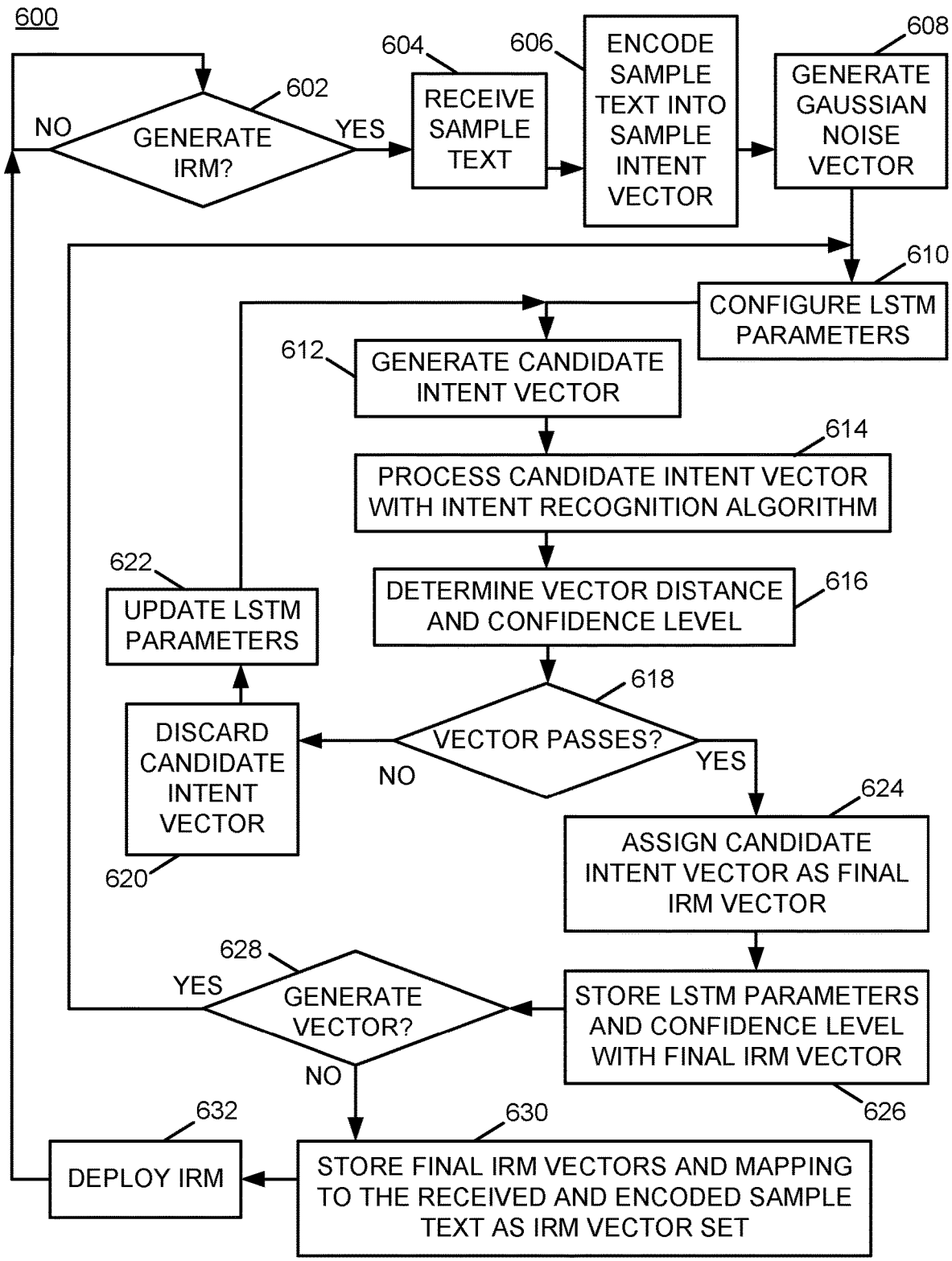
FIG. 6 is a flow chart of an example of an implementation of a process for automated intent recognition model creation from randomized intent vector proximities that illustrates additional details and certain additional/alternative operations according to an embodiment of the present subject matter.

FIG. 5 through FIG. 6 described below represent example processes that can be executed by devices, such as the core processing module 200, to perform the automated intent recognition model creation from randomized intent vector proximities associated with the present subject matter. Many other variations on the example processes are possible and all are considered within the scope of the present subject matter. The example processes can be performed by modules, such as the intent vector creation and proximity validation module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes can be combined, sequences of the processing described can be changed, and additional processing can be added or removed without departure from the scope of the present subject matter.

FIG. 5 is a flow chart of an example of an implementation of a process 500 for automated intent recognition model creation from randomized intent vector proximities. The process 500 represents a computer-implemented method of performing the computer-based validated intent recognition model creation described herein. At block 502, the process 500 generates, from an input intent vector, a plurality of candidate intent vectors. At block 504, the process 500 performs a validation of the plurality of candidate intent vectors that selects as valid intent vectors any of the plurality of candidate intent vectors that are semantically similar to the input intent vector.

FIG. 6 is a flow chart of an example of an implementation of a process 600 for automated intent recognition model creation from randomized intent vector proximities that illustrates additional details and certain additional/alternative operations. The process 600 represents a computer-implemented method of performing the computer-based validated intent recognition model creation described herein. At decision point 602, the process 600 makes a determination as to whether to generate an intent recognition model (IRM). In response to determining to generate an intent recognition model, the process 600 receives sample text at block 604. The sample text is a phrase or sentence to be encoded, and for which an intent recognition model is to be generated. At block 606, the process 600 encodes the sample text into a sample intent vector. As described above, the sample intent vector is generated into a multi-dimensional matrix from the received sample text, where each word corresponds to a dimensional vector (e.g., dimension=300). The sample intent vector as a multi-dimensional matrix of dimensional vectors is used as input for intent vector generation and validation processing. The sample intent vector includes a sequence of data elements that represent the sample text. As such, the sample intent vector represents the sequence of digitized words/utterances as a sequence of encoded and distinguishable elements.

At block 608, the process 600 generates a Gaussian noise vector based upon the sample intent vector. As described above, the Gaussian noise vector includes a sequence of data elements that each represents a Gaussian noise distribution relative to the respective elements that form the sample intent vector, and is also a matrix of noise elements. As such, there is a mapping between elements of the sample intent vector and Gaussian noise distribution elements of the Gaussian noise vector.

At block 610, the process 600 configures long short-term memory (LSTM) parameters to be used by an LSTM model for generation of candidate intent vectors. As described above, the LSTM model generates candidate intent vectors by parallel processing of the respective sample intent vector and the Gaussian noise vector. The output of LSTM processing results in a set of candidate intent vectors.

The process 600 begins iterative processing to generate a set of candidate intent vectors. At block 612, the process 600 generates a candidate intent vector, again by parallel processing of the sample intent vector with the Gaussian noise vector. Each element of the sample intent vector as a matrix is randomly processed according to the respective element of the Gaussian noise vector to create a unique candidate intent vector.

The process 600 then begins candidate intent vector validation processing. At block 614, the process 600 processes the candidate intent vector with an intent recognition algorithm. At block 616, the process 600 determines a vector distance and confidence level of the candidate intent vector relative to the sample intent vector. The vector distance and confidence level of the candidate intent vector are determined by measuring a multi-dimensional vector distance of the candidate intent vector from the sample intent vector, such as by determining matrix-dimensional cosine similarity of the two multi-dimensional vectors/matrices. An acceptable multi-dimensional vector distance or threshold for accepting a candidate intent vector as a valid intent vector is established and configured by use of any suitable vector distance algorithm. For purposes of example and not limitation, a multi-dimensional vector distance or other distance measurement technique can be utilized, and a threshold multi-dimensional vector distance of zero point eight five (0.85), alternatively stated as a confidence level of eighty-five percent (85%), may be configured such that any candidate intent vector with a multi-dimensional vector distance that meets or exceeds a confidence level of eighty-five percent (85%) is considered a valid intent vector, while any candidate intent vector with a multi-dimensional vector distance that has a confidence level lower than eighty-five percent (85%) is not considered a valid intent vector. It should be noted that many techniques for measuring vector distances are possible, and all such techniques are considered to be within the scope of the present subject matter.

The process 600 then begins filter-based processing to determine the quality of match of the candidate intent vector relative to the sample intent vector. At decision point 618, the process 600 makes a determination from the measurement of loss and confidence level of the candidate intent vector as to whether the candidate intent vector passes validation. As described above, a candidate intent vector is considered a valid vector, and thereby passes validation, if the candidate intent vector is close to the sample intent vector in the multi-dimensional intent vector space (e.g., greater than or equal to 0.85 for a matrix-dimensional cosine similarity).

In response to determining at decision point 618 that the candidate intent vector does not pass validation (e.g., lower than 0.85 for a matrix-dimensional cosine similarity), the process 600 begins iterative feedback processing to tune the candidate intent vector generation parameters of the LSTM model that are used for generation of candidate intent vectors. At block 620, the process 600 discards the candidate intent vector that did not pass validation. At block 622, the process 600 updates the LSTM parameters used to generate the candidate intent vector from the sample intent vector and the Gaussian noise vector. The process iterates and returns to block 612 to generate a new candidate intent vector using the updated LSTM parameters, and iterates as described above.

Returning to the description of decision point 618, in response to determining that the candidate intent vector passes validation (e.g., greater than or equal to 0.85 for a matrix-dimensional cosine similarity), the process 600 assigns the candidate intent vector as a final intent recognition model (IRM) vector by adding the candidate intent vector to the intent recognition model at block 624. At block 626, the process 600 stores the LSTM parameters used during creation of the validated intent vector and the determined confidence level with the final IRM vector.

At decision point 628, the process 600 makes a determination as to whether to iterate to generate and validate another candidate intent vector. In response to determining to generate and validate another candidate invent vector, the process 600 returns to block 610 to configure new LSTM parameters to cause the LSTM model to generate a new/unique candidate intent vector based upon the sample intent vector and the Gaussian noise vector. As such, the process 600 iteratively adjusts the LSTM parameters to rapidly generate multiple validated intent vectors within an intent recognition model.

The process 600 iterates as described above to generate and validate candidate intent vectors until sufficient final IRM vectors have been added to the intent recognition model to achieve intent recognition across the variety of automatically-generated intent vectors of the intent recognition model during deployment. In response to determining at decision point 628 not to generate and validate another candidate intent vector, the process 600 stores the final IRM vectors and mappings to the received and encoded sample text as an intent recognition model vector set at block 630. At block 632, the process 600 deploys the generated intent recognition model, such as to the IRM database 110 or otherwise as appropriate for a given implementation. The process 600 returns to decision point 602 and iterates as described above.

As such, the process 600 receives and encodes sample text into a sample intent vector, and processes the sample intent vector in parallel with a Gaussian noise vector using an LSTM model that has been parameterized to adjust the effects of the Gaussian noise vector elements on the elements of the sample intent vector. The process 600 iteratively generates and validates candidate intent vectors within a feedback loop that adjusts the LSTM parameters until a high-quality (close proximity/minimal distance) final IRM vector results. The process 600 iteratively creates final IRM vectors until a sufficient number of final IRM vectors span natural (random) variations of the original sample text. The process 600 stores the validated set of final IRM vectors as the intent recognition model, and deploys the computer-generated intent recognition model.

Some embodiments of the present invention improve the technology of computers in one, or more, of the following ways: (i) lower input data requirements for large scale intent recognition model generation; (ii) more rapid generation of intent recognition models using less data; and (iii) more accurate deployed intent recognition from the generated intent recognition models.

The present invention is not abstract because it relates particularly to computer operations and/or hardware for reasons that include the following: (i) computer-controlled processing that creates more-accurate intent recognition models on a large scale using less input than conventional processes; (ii) computer-controlled distributions of final/validated intent vectors that programmatically vary sample intent vectors and thereby improve intent recognition model creation; and (iii) computer-controlled processing that improves accuracy of computers at recognizing user intent from a user's spoken phrases.

As described above in association with FIG. 1 through FIG. 6, the example systems and processes provide intent recognition model creation from randomized intent vector proximities. Many other variations and additional activities associated with intent recognition model creation from randomized intent vector proximities are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method for automating intent recognition model (IRM) creation comprising:
   encoding, by a processor, sample text into a sample intent vector comprising a multi-dimensional matrix wherein each word of the sample text corresponds to a dimensional vector;
   generating, by the processor, a Gaussian noise vector based upon the sample intent vector, the Gaussian noise vector comprising a sequence of data elements representing a Gaussian noise distribution relative to respective data elements that form the sample intent vector;
   configuring, by the processor, long short-term memory (LSTM) parameters of a LSTM model;
   parallel processing, by the processor, the sample intent vector and the Gaussian noise vector using the LSTM model to generate a set of candidate intent vectors;
   determining, by the processor, a measurement of a vector distance and confidence level of a candidate intent vector, of the set of candidate intent vectors, relative to the sample intent vector;
   validating, by the processor, the candidate intent vector as valid using filter-based processing, wherein the candidate intent vector is considered valid upon meeting or exceeding a threshold level of confidence and the candidate intent vector is close to the sample intent vector in multidimensional intent vector space; and
   in response to validating the candidate intent vector as valid, assigning the candidate intent vector as a final IRM vector by adding the candidate intent vector to the intent recognition model.

2. The computer-implemented method of claim 1, wherein the sample intent vector includes a sequence of data elements representing the sample text as a sequence of digitized words and utterances.

3. The computer-implemented method of claim 1, wherein determining the vector distance and confidence level of the candidate intent vector relative to the sample intent vector is determined by measuring a multi-dimensional vector distance of the candidate intent vector from the sample intent vector by determining matrix-dimensional cosine similarity.

4. The computer-implemented method of claim 1, wherein the candidate intent vector is considered close to the sample intent vector in the multidimensional intent vector space when a matrix-dimensional cosine similarity between the candidate intent vector and the sample intent vector is greater than or equal to 0.85.

5. The computer-implemented method of claim 1, further comprising:
   storing, by the processor, the LSTM parameters, the final IRM vector and the sample text encoded into the sample intent vector as an IRM vector set of the intent recognition model.

6. The computer-implemented method of claim 1, further comprising:
   deploying, by the processor, the intent recognition model as part of a database.

7. The computer-implemented method of claim 1, further comprising:
   inputting digital values of the multi-dimensional matrix into a convolutional neural network model, wherein intermediate results after maximum-pooling layer processing is selected as the sample intent vector representing the sample text in the sample text's entirety abstracted into the sample intent vector.

8. A computer system for automating intent recognition model (IRM) creation comprising:
   a processor; and
   a computer-readable storage media coupled to the processor, wherein the computer-readable storage media contains program instructions executing a computer-implemented method comprising the steps of:
      encoding, by the processor, sample text into a sample intent vector comprising a multi-dimensional matrix wherein each word of the sample text corresponds to a dimensional vector;
      generating, by the processor, a Gaussian noise vector based upon the sample intent vector, the Gaussian noise vector comprising a sequence of data elements representing a Gaussian noise distribution relative to respective data elements that form the sample intent vector;
      configuring, by the processor, long short-term memory (LSTM) parameters of a LSTM model;
      parallel processing, by the processor, the sample intent vector and the Gaussian noise vector using the LSTM model to generate a set of candidate intent vectors;
      determining, by the processor, a measurement of a vector distance and confidence level of a candidate intent vector, of the set of candidate intent vectors, relative to the sample intent vector;
      validating, by the processor, the candidate intent vector as valid using filter-based processing, wherein the candidate intent vector is considered valid upon meeting or exceeding a threshold level of confidence and the candidate intent vector is close to the sample intent vector in multidimensional intent vector space; and
      in response to validating the candidate intent vector as valid, assigning the candidate intent vector as a final IRM vector by adding the candidate intent vector to the intent recognition model.

9. The computer system of claim 8, wherein the sample intent vector includes a sequence of data elements representing the sample text as a sequence of digitized words and utterances.

10. The computer system of claim 8, wherein determining the vector distance and confidence level of the candidate intent vector relative to the sample intent vector is determined by measuring a multi-dimensional vector distance of the candidate intent vector from the sample intent vector by determining matrix-dimensional cosine similarity.

11. The computer system of claim 8, wherein the candidate intent vector is considered close to the sample intent vector in the multidimensional intent vector space when a matrix-dimensional cosine similarity between the candidate intent vector and the sample intent vector is greater than or equal to 0.85.

12. The computer system of claim 8, further comprising:
   storing, by the processor, the LSTM parameters, the final IRM vector and the sample text encoded into the sample intent vector as an IRM vector set of the intent recognition model.

13. The computer system of claim 8, further comprising: deploying, by the processor, the intent recognition model as part of a database.

14. The computer system of claim 8, further comprising: inputting digital values of the multi-dimensional matrix into a convolutional neural network model, wherein intermediate results after maximum-pooling layer processing is selected as the sample intent vector representing the sample text in the sample text's entirety abstracted into the sample intent vector.

15. A computer program product for automating intent recognition model (IRM) creation comprising:
one or more computer readable storage media having computer-readable program instructions stored on the one or more computer readable storage media, said program instructions executes a computer-implemented method comprising:
encoding, by a processor, sample text into a sample intent vector comprising a multi-dimensional matrix wherein each word of the sample text corresponds to a dimensional vector;
generating, by the processor, a Gaussian noise vector based upon the sample intent vector, the Gaussian noise vector comprising a sequence of data elements representing a Gaussian noise distribution relative to respective data elements that form the sample intent vector;
configuring, by the processor, long short-term memory (LSTM) parameters of a LSTM model;
parallel processing, by the processor, the sample intent vector and the Gaussian noise vector using the LSTM model to generate a set of candidate intent vectors;
determining, by the processor, a measurement of a vector distance and confidence level of a candidate intent vector, of the set of candidate intent vectors, relative to the sample intent vector;
validating, by the processor, the candidate intent vector as valid using filter-based processing, wherein the candidate intent vector is considered valid upon meeting or exceeding a threshold level of confidence and the candidate intent vector is close to the sample intent vector in multidimensional intent vector space; and
in response to validating the candidate intent vector as valid, assigning the candidate intent vector as a final IRM vector by adding the candidate intent vector to the intent recognition model.

16. The computer program product of claim 15, wherein the sample intent vector includes a sequence of data elements representing the sample text as a sequence of digitized words and utterances.

17. The computer program product of claim 15, wherein determining the vector distance and confidence level of the candidate intent vector relative to the sample intent vector is determined by measuring a multi-dimensional vector distance of the candidate intent vector from the sample intent vector by determining matrix-dimensional cosine similarity.

18. The computer program product of claim 15, wherein the candidate intent vector is considered close to the sample intent vector in the multidimensional intent vector space when a matrix-dimensional cosine similarity between the candidate intent vector and the sample intent vector is greater than or equal to 0.85.

19. The computer program product of claim 15, further comprising:
storing, by the processor, the LSTM parameters, the final IRM vector and the sample text encoded into the sample intent vector as an IRM vector set of the intent recognition model.

20. The computer program product of claim 15, further comprising:
inputting digital values of the multi-dimensional matrix into a convolutional neural network model, wherein intermediate results after maximum-pooling layer processing is selected as the sample intent vector representing the sample text in the sample text's entirety abstracted into the sample intent vector.

\* \* \* \* \*